United States Patent [19]
Shiell et al.

[11] Patent Number: 6,119,222
[45] Date of Patent: Sep. 12, 2000

[54] COMBINED BRANCH PREDICTION AND CACHE PREFETCH IN A MICROPROCESSOR

[75] Inventors: Jonathan H. Shiell; James O. Bondi, both of Plano, Tex.

[73] Assignee: Texas Instruments Incorporated, Dallas, Tex.

[21] Appl. No.: 08/994,596

[22] Filed: Dec. 19, 1997

Related U.S. Application Data

[60] Provisional application No. 60/033,435, Dec. 23, 1996.

[51] Int. Cl.[7] ........................................... G06F 9/32
[52] U.S. Cl. .............................................. 712/238
[58] Field of Search .................... 395/584, 585; 712/238, 237

[56] References Cited

U.S. PATENT DOCUMENTS

| | | | |
|---|---|---|---|
| 5,537,573 | 7/1996 | Ware et al. | 711/137 |
| 5,778,435 | 7/1998 | Berenbaum et al. | 711/137 |
| 5,826,052 | 10/1998 | Stiles et al. | 712/205 |
| 5,864,697 | 1/1999 | Shiell | 712/240 |

*Primary Examiner*—Kenneth Coulter
*Attorney, Agent, or Firm*—Rebecca Mapston Lake; Richard L. Donaldson

[57] ABSTRACT

A microprocessor (10) and corresponding system (300) is disclosed in which prefetch of instruction or data from higher level memory (11; 307; 305) may be performed in combination with a fetch from a lower level cache (16). A branch target buffer (56) has a plurality of entries (63) associated with branching instructions; in addition to the tag field (TAG) and target field (TARGET), each entry (63) includes prefetch fields (PF0 ADDR; PF1 ADDR) containing the addresses of memory prefetches that are to be performed in combination with the fetch of the branch target address. Graduation queue and tag check circuitry (27) is provided to update the contents of the prefetch fields (PF0 ADDR; PF1 ADDR) by interrogating instructions that are executed following the associated branching instruction to detect instructions that involve cache misses, in particular the target of the next later branching instruction.

20 Claims, 6 Drawing Sheets

COMBINED BRANCH PREDICTION AND CACHE PREFETCH IN A MICROPROCESSOR

This application claims priority under 35 USC 119(e) (1) of provisional application Ser. No. 60/033,435, filed Dec. 23, 1996.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of microprocessors, and is more specifically directed to cache memory utilization therein.

In the field of microprocessors and other programmable logic devices, many improvements have been made in recent years which have resulted in significant performance improvements. One such improvement is the implementation of pipelined architectures, in which multiple microprocessor instructions are processed simultaneously along various stages of execution, so that the processing of subsequent instructions (in program order) begins prior to the completion of earlier instructions. Because of pipelining, the effective rate at which instructions are executed by a microprocessor can approach one instruction per machine cycle in a single pipeline microprocessor, even though the processing of each individual instruction may require multiple machine cycles from fetch through execution. So-called superscalar architectures effectively have multiple pipelines operating in parallel, providing even higher theoretical performance levels.

Conditional branching instructions present complexity in microprocessors of pipelined architecture, because the condition upon which the branch depends is not known until execution, which may be several cycles after fetch. In these situations, the microprocessor must either cease fetching instructions after the branch until the condition is resolved, introducing a "bubble" of empty stages (i.e., potential instruction processing slots) into the pipeline, or must instead speculatively fetch an instruction (in effect guessing the condition) in order to keep the pipeline full, at a risk of having to "flush" the pipeline of its current instructions if the speculation is determined to be incorrect.

The benefit of speculative execution of instructions in keeping the pipeline full, particularly in architectures with long or multiple pipelines, typically outweighs the performance degradation of pipeline flushes, so long as the success rate of the speculative execution is reasonable. Many modern microprocessors therefore follow some type of branch prediction techniques by way of which the behavior of branching instructions may be predicted with some accuracy. Well-known approaches to branch prediction include "static" prediction, according to which the prediction does not change over time or history, and "dynamic" prediction, in which the branch prediction is made according to the results of previously executed branches.

An advanced type of conventional dynamic branch prediction approach predicts the outcome of a branching instruction based upon its own branching history, as opposed to the branch results of other instructions. This approach is generally incorporated into modern microprocessors by way of a branch target buffer. A conventional branch target buffer, or BTB, is a cache-like table of entries that each store an identifier (a "tag") for recently-encountered branching instructions, a branch history-related code upon which prediction is made, and a target address of the next instruction to be fetched if the branch is predicted as taken (the next sequential address being the address to be fetched for a "not taken" prediction). When a block of instructions containing a branching instruction is fetched, its address is matched against the tags in the BTB to determine if the block containing this instruction has been previously encountered; if so, the next fetch will correspond to the block of instructions indicated by the target address, depending upon the prediction code indicated in the BTB for that instruction. Newly-encountered branching instructions are statically predicted, as no history is present in the BTB. Upon execution and completion of the instruction, the BTB entry is created (in the first instance) or modified (in later instances) to reflect the actual result of the branching instruction in predicting the outcome of the next instance of that instruction.

Another well-known technique which has greatly improved the performance of modern microprocessors is the implementation of one or more levels of cache memory. As is fundamental in the art, modern microprocessor-based systems utilize high-speed random access memory, both on-chip and also in external cache subsystems, as cache memories. Cache memories are typically used to store the contents of memory locations that are near neighbors of memory locations fetched by the microprocessor from slower main memory. For example, each time that a four byte data word is to retrieved from main memory, a thirty-two byte memory access is performed to obtain the desired four-byte data word, and to store it in the cache along with neighboring data as a thirty-two byte cache line. Subsequent accesses to any of the data words in the cache line may thus be made much more rapidly than if a main memory access is required. To the extent that successive memory accesses are made to neighboring memory locations, as is typically the case, the presence of the neighboring memory location contents in the cache can greatly reduce the number of wait states that would otherwise be required in performing the same access to off-chip memory.

Typical microprocessors and microprocessor-based systems organize their caches according to multiple levels. For example, a conventional microprocessor may include an on-chip "level-0" data cache, dedicated level-1 on-chip instruction and data caches, and a unified level-2 cache in an external cache subsystem. In this arrangement, a memory address would be applied sequentially to the various levels, with a cache miss (i.e., the cache does not contain the desired address) at a lower-level cache resulting in the memory address being applied to the next higher level of cache. Upon cache misses in all levels, main memory would be accessed, typically by retrieving a full cache line of data or instruction codes to permit cache access thereto in a later cycle. Of course, the penalty (in wait states) associated with a cache miss becomes more severe for cache misses at higher levels. For example, one wait state may be associated with a miss at level 0 and a hit at level 1, two wait states may be associated with a cache miss at level 1 and a hit at level 2, but twenty-five waits states may be required in accessing main external memory in the event of a cache miss at the level 2 unified cache. The cache hit rate thus becomes of significant importance in the overall performance of the microprocessor and its system.

As noted above, memory that is copied into cache is typically selected because of its nearness to previously accessed memory locations, such that the regular sequential accessing of memory, both for data and instructions, will have a relatively high cache hit rate. However, also as noted above, many conventional programs include branching instructions, such that the flow of the program is not always sequential. Accordingly, not only do cache misses commonly occur when the next instruction to be fetched is not in the recent sequence, as in the case of a branching instruction that is predicted as taken, but the penalty resulting from such misses can be substantial when a main memory access is required.

BRIEF SUMMARY OF THE INVENTION

It is therefore an object of the present invention to provide a microprocessor and system in which the cache hit rate is improved.

It is a further object of the present invention such a microprocessor and system in which the branch prediction mechanism is used to initiate prefetching of memory locations into cache memory.

It is a further object of the present invention to provide such a microprocessor and system in which such cache prefetching is initiated based upon the execution results of previous instructions.

It is a further object of the present invention to provide such a microprocessor and system in which the cache prefetching is dynamically controlled.

Other objects and advantages of the present invention will be apparent to those of ordinary skill in the art having reference to the following specification together with its drawings.

The present invention may be implemented into a microprocessor utilizing a branch target buffer in the dynamic branch prediction of execution, by including at least one cache prefetch field with each branch target buffer entry. The prefetch field indicates a memory location that is to be prefetched in combination with the fetch of the target instruction, and that is filled with the cache prefetch address at completion of execution of the branch instruction, by tracking cache misses in instructions following execution of the branch.

DETAILED DESCRIPTION OF THE INVENTION

Figure 1:
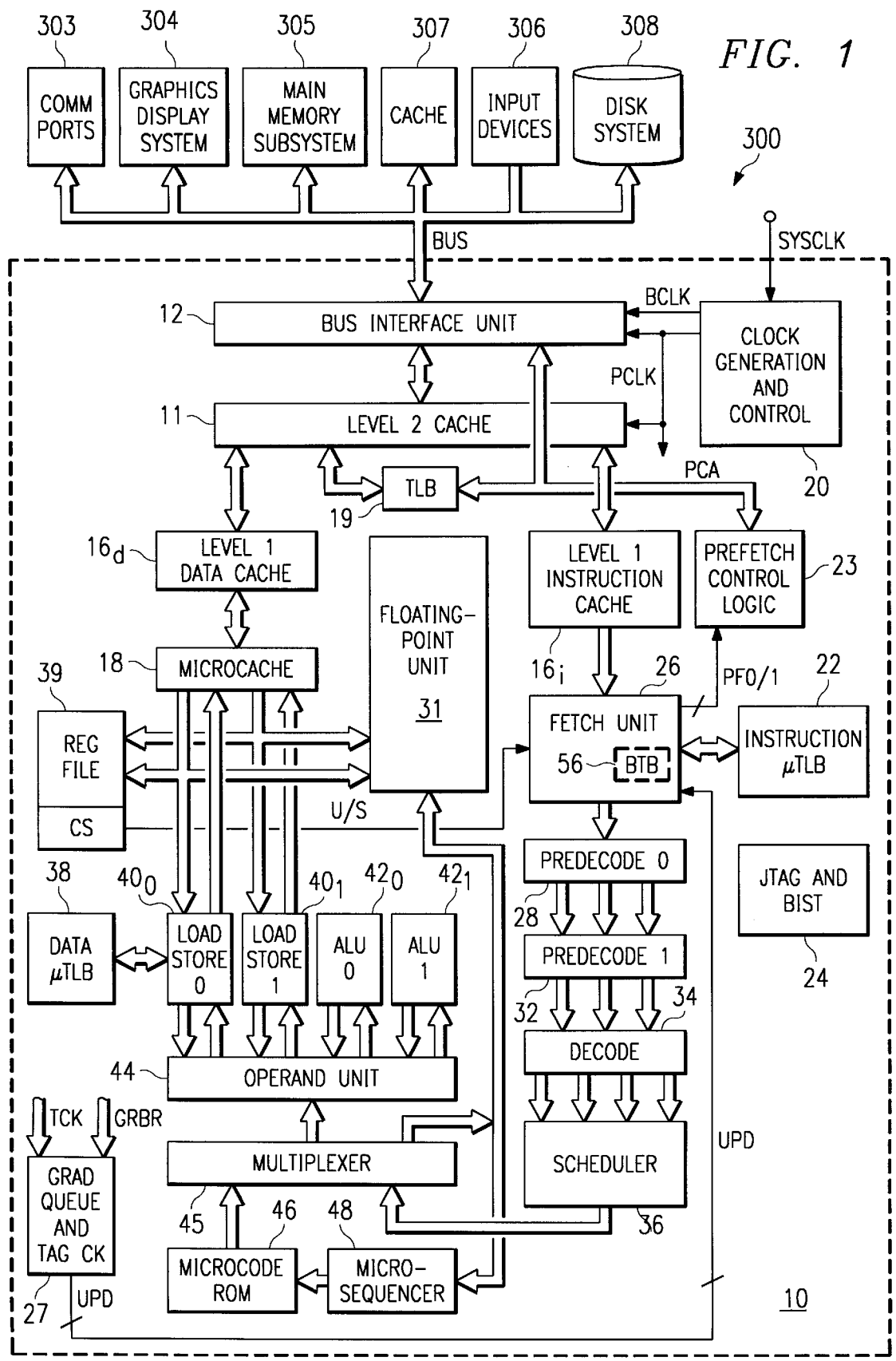
FIG. 1 is an electrical diagram, in block form, of a microprocessor and system constructed according to the preferred embodiments of the invention.

Referring now to FIG. 1, an exemplary data processing system 300, including an exemplary superscalar pipelined microprocessor 10 within which the preferred embodiment of the invention is implemented, will be described. It is to be understood that the architecture of system 300 and of microprocessor 10 is described herein by way of example only, as it is contemplated that the present invention may be utilized in microprocessors of various architectures. It is therefore contemplated that one of ordinary skill in the art, having reference to this specification, will be readily able to implement the present invention in such other microprocessor architectures. It is further contemplated that the present invention may be realized in single-chip microprocessors and microcomputers or in multiple-chip implementations, with the manufacture of such integrated circuits accomplished according to silicon substrate, silicon-on-insulator, gallium arsenide, and other manufacturing technologies, and using MOS, CMOS, bipolar, BiCMOS, or other device implementations.

Microprocessor 10, as shown in FIG. 1, is connected to other system devices by way of external bus BUS. While external bus BUS, in this example, is shown as a single bus, it is of course contemplated that external bus BUS may represent multiple buses having different speeds and protocols, as is known in conventional computers utilizing the PCI local bus architecture. System 300 contains such conventional subsystems as communication ports 303 (including modem ports and modems, network interfaces, and the like), graphics display system 304 (including video memory, video processors, a graphics monitor), main memory system 305 which is typically implemented by way of dynamic random access memory (DRAM) input devices 306 (including keyboard, a pointing device, and the interface circuitry therefor), and disk system 308 (which may include hard disk drives, floppy disk drives, and CD-ROM drives). Typical implementations of system 300 also typically include external cache memory 307, which is high-speed memory implemented in combination with cache tag comparator and control circuitry, so that expected memory accesses may be performed rapidly, without requiring access to the slower main memory 305. It is therefore contemplated that system 300 of FIG. 1 corresponds to a conventional desktop computer or workstation, as are now common in the art. Of course, other system implementations of microprocessor 10 can also benefit from the present invention, as will be recognized by those of ordinary skill in the art.

Microprocessor 10 includes bus interface unit (BIU) 12 connected to external bus BUS, which controls and effects communication between microprocessor 10 and the other elements in a system 300. BIU 12 includes the appropriate control and clock circuitry to perform this function, including write buffers for increasing the speed of operation, and including timing circuitry so as to synchronize the results of internal microprocessor operation with bus BUS timing constraints. Microprocessor 10 also includes clock generation and control circuitry 20 which generates clock phases based upon system clock SYSCLK; in this example, clock generation and control circuitry 20 generates bus clock BCLK and core clock PCLK from system clock SYSCLK.

Figure 2:
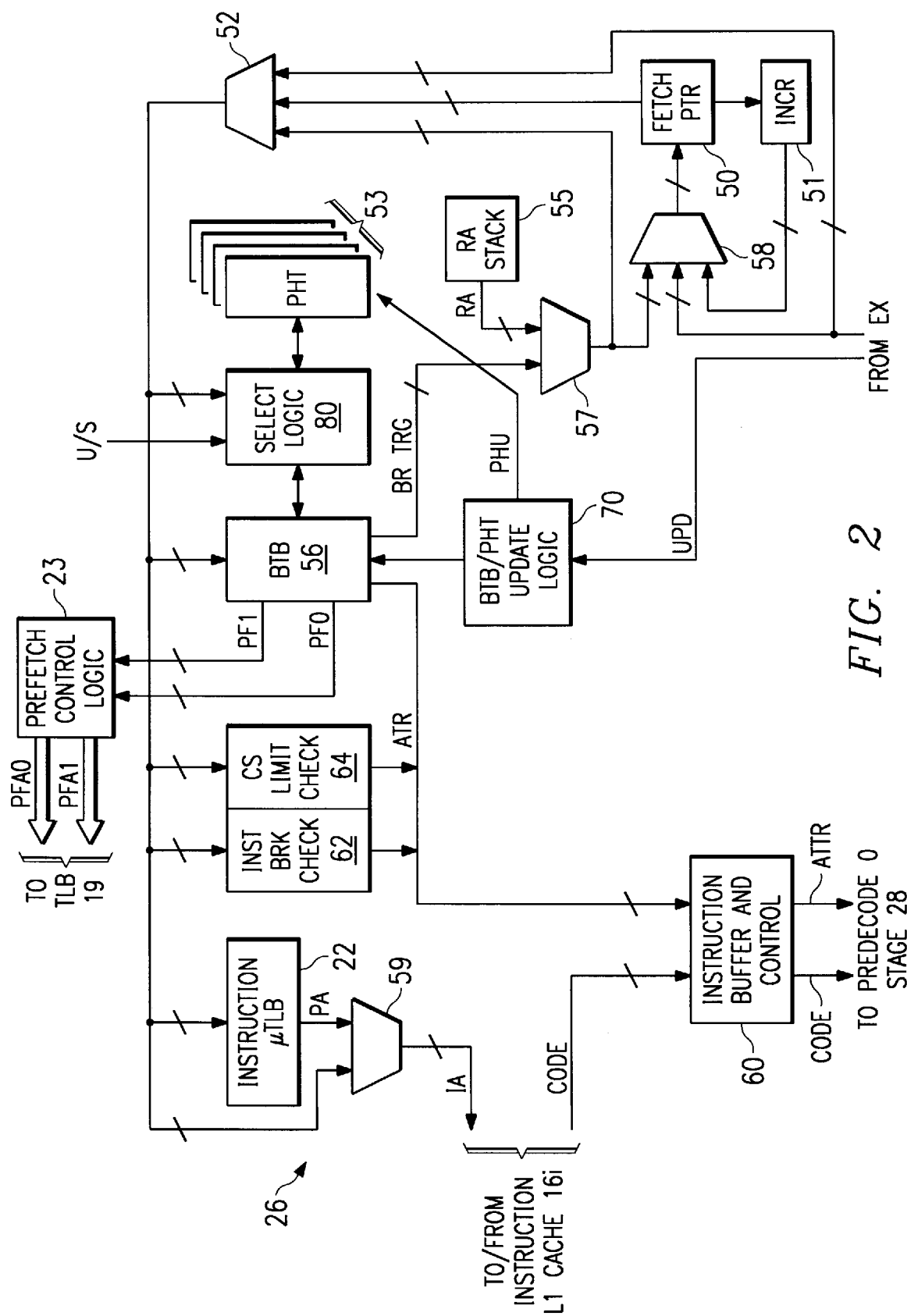
FIG. 2 is an electrical diagram, in block form, of the fetch unit in the microprocessor of FIG. 1 according to the preferred embodiments of the invention.

As is evident in FIG. 1, microprocessor 10 has three levels of internal cache memory, with the highest of these as level 2 cache 11, which is connected to BIU 12 by way of an internal bus. In this example, level 2 cache 11 is a unified cache, and is configured to receive all cacheable data and cacheable instructions from bus BUS via BIU 12, such that much of the bus traffic presented by microprocessor 10 is accomplished via level 2 cache 11. Microprocessor 10 may also effect bus traffic around cache 11, by treating certain bus reads and writes as "not cacheable". Level 2 cache 11, as shown in FIG. 2, is connected to two level 1 caches 16; level 1 data cache $16_d$ is dedicated to data, while level 1 instruction cache $16_i$ is dedicated to instructions. Microcache 18 is a fully dual-ported level 0 data cache, in this example. Main translation look-aside buffer (TLB) 19 controls memory accesses to level 2 cache 11 and to main memory via BIU 12, such control including the sequencing of accesses to the page tables in memory for address translation. TLB 19 also serves as a cache for the page tables. Instruction microtranslation lookaside buffer ($\mu$TLB) 22 and data microtranslation lookaside buffer ($\mu$TLB) 38 are provided to translate logical data addresses into physical addresses for accesses to level 1 instruction cache $16_i$ and level 1 data cache $16_d$, respectively, in the conventional manner.

As shown in FIG. 1, microprocessor 10 is of the superscalar type, and thus includes multiple execution units. These execution units include two ALUs $42_0$, $42_1$ for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. As conventional in the art, register file 39 includes general purpose registers that are available for programmer use, and also control registers including code segment register CS.

These multiple execution units are controlled by way of multiple pipelines of seven stages each, with write-back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units (including FPU 31) |
| OP | Operand: This stage retrieves the register operands indictaed by the AOps |
| EX | Execute: This stage runs the execution units according to the AOps and the retrieved operands |
| WB | Write-back: This stage stores the results of the execution in registers or in memory |

Referring back to FIG. 1, the pipeline stages noted above are performed by various functional blocks within microprocessor 10. Fetch unit 26 generates instruction addresses from the instruction pointer by way of instruction microtranslation lookaside buffer ($\mu$TLB) 22, for application to level 1 instruction cache $16_i$, including according to branch prediction techniques by way of branch target buffer (BTB) 56 as will be described in further detail hereinbelow. Instruction cache $16_i$ produces a stream of instruction data to fetch unit 26, which in turn provides the instruction code to predecode 0 stage 28 and predecode 1 stage 32 in the desired sequence. These two stages operate as separate pipeline stages, and together operate to locate up to three x86 instructions and apply the same to decoder 34. Predecode 0 stage 28 determines the size and position of as many as three variable-length x86 instructions, while predecode 1 stage 32 recodes the multibyte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to RISC instructions. Scheduler 36 reads up to four AOps from the decode queue at the output of decode unit 34, and assigns these AOps to the appropriate execution units. Operand unit 44 receives an input from scheduler 36 and also from microcode ROM 46, via multiplexer 45, and fetches register operands for use in the execution of the instructions. In addition, according to this example, operand unit 44 also performs operand forwarding to send results to registers that are ready to be stored, and performs address generation for AOps of the load and store type.

Microsequencer 48 and microcode ROM 46 control ALUs 42 and load/store units 40 in the execution of microcode entry AOps, which are generally the last AOps to execute in a cycle. In this example, microsequencer 48 sequences through microinstructions stored in microcode ROM 46, to effect control responsive to microcoded microinstructions such as complex or rarely-used x86 instructions, x86 instructions that modify segment or control registers, handling of exceptions and interrupts, and multicycle instructions (such as REP instructions, and instructions that PUSH and POP all registers).

Microprocessor 10 also includes circuitry 24 for controlling the operation of JTAG scan testing, and of certain built-in self-test (BIST) functions, ensuring the validity of the operation of microprocessor 10 upon completion of manufacturing, and upon resets and other events.

According to the preferred embodiment of the present invention, microprocessor 10 also includes prefetch control logic 23, for controlling the prefetch of instructions or data from external memory 305, 307, or from level 2 cache 11, into lower cache levels such as level 1 instruction cache $16_i$ and level 1 data cache $16_d$. As will be described in further detail hereinbelow, prefetch control logic 23 initiates accesses to level 2 cache 11 simultaneously with the fetch of the target of a branch instruction from level 1 instruction cache $16_i$, with the prefetched information corresponding to the targets of later branch instructions in the pipeline and to expected cache misses. As illustrated in FIG. 1, prefetch control logic 23 receives possible prefetch addresses and control information from fetch unit on lines PFO/1, and generates prefetch requests and addresses to TLB 19 on bus PFA.

As will become apparent in further detail from the following description, the prefetches that are performed in combination with a branch target fetch, according to the preferred embodiment of the invention, are determined by monitoring the execution of program instructions that follow earlier instances of the branch instruction that initiates the fetch. Accordingly, microprocessor 10 further includes graduation queue and tag check circuitry 27, which receives information from the various execution units for instructions that are completing execution on lines GRBR (for branches) and on lines TCK (for all instructions, including branches). Based upon the results and other factors from the execution of instructions, graduation queue and tag check circuitry 27 issues update information to fetch unit 26 on bus UPD. As will be described in further detail hereinbelow, the information communicated on bus UPD includes the addresses of instructions for which prefetches may be beneficial (e.g., instructions that involved serious cache misses), associated with an earlier branch instruction; fetch unit 26 and prefetch control logic 23 utilize this information to initiate prefetches simultaneously with the fetch of branch targets, so that the likelihood of a cache miss upon a later pass through the same sequence of instructions may be avoided.

Referring now to FIG. 2, the construction and operation of fetch unit 26 in combination with prefetch control logic 23 according to the preferred embodiment of the invention will now be described. As noted above, fetch unit 26 performs the function of determining the address of the next instruction to be fetched for decode. As such, fetch unit 26 determines the sequence in which instructions are loaded into the pipelines of microprocessor 10, and in this embodiment of the invention thus controls the speculative execution of addresses, particularly by way of branch prediction.

The operation of fetch unit 26 is based upon a logical fetch address FA that is generated according to one of several ways, as selected by multiplexer 52. Fetch address FA may be generated merely from the contents of fetch pointer 50 in fetch unit 26, in the case where the next sequential address is to be fetched for decoding. As shown in FIG. 2, fetch pointer 50 is a register in fetch unit 26, having an output connected to one input of multiplexer 52 and also to incrementer 51. Incrementer 51 incrementally advances the value of the fetch address, and applies the incremented fetch address to an input of multiplexer 58 for possible storage in fetch pointer 50 and use in the next fetch. Multiplexer 58 is provided to select the source of updated contents of fetch pointer 50 for the next access. A second way in which the fetch address FA is generated is by one of the execution units (e.g., microsequencer 48) to multiplexer 52, for example in the event of a branch that is not predicted by fetch unit 26; this value is also applied to an input of multiplexer 58, for storing in fetch pointer 50 as appropriate.

Fetch address FA is presented to various functions in fetch unit 26 to control the fetching of the next instruction for decoding. For example, fetch unit 26 is in communication with instruction μTLB 22, which returns a physical address PA matching the logical fetch address FA if it points to a location that has previously been translated; alternatively, the logical fetch address FA will be translated into a physical address by TLB 19, which is external to fetch unit 26. In any event, an instruction address IA is presented by fetch unit 26 to level 1 instruction cache $16_i$ to retrieve instruction codes therefrom; of course, if a cache miss at level 1 instruction cache $16_i$ occurs, the physical address is presented to unified level 2 cache 14 and, in the event of a cache miss at that level, to main memory. In response to instruction address IA, level 1 instruction cache $16_i$ presents an instruction code sequence CODE to instruction buffer 60 in fetch unit 26, for eventual presentation to predecode 0 stage 28. In the case where each instruction address IA addresses a block of sixteen instructions, instruction buffer 60 has a capacity of sixteen instructions.

Fetch unit 26 also includes other conventional functions, such as instruction break check circuit 62 which halts additional fetching for instructions identified as breaks. Fetch unit 26 also includes a code segment limit check circuit 64, for determining whether logical fetch address FA points to an address outside the limit of the bounds of the current code segment.

As noted above, fetch unit 26 includes circuitry for generating the next fetch address FA in ways that are not in program sequence. As shown in FIG. 2, fetch unit 26 includes return address queue 55, which is a last-in-first-out (LIFO) memory having several locations, at which return addresses for subroutine calls and subroutine returns are stored for use in speculative execution of subroutines.

In this embodiment of the invention, fetch unit 26 also includes branch target buffer (BTB) 56, which is a cache-like arrangement of entries that store data indicating the prior history of branches from which the current instance of a branching instruction may be predicted, along with target addresses of branching instructions for use as the fetch address FA, so that the pipeline may be maintained in a filled condition as often as possible. BTB 56 accomplishes this by determining whether each current fetch address FA points to a branch instruction that has recently been fetched, and for which branch history is stored in BTB 56 for use in speculative execution. As is known in the art, speculative execution is an important performance enhancement in deeply pipelined microprocessors such as superscalar microprocessor 10 of FIG. 1, as mispredicted branches (or pipeline stalls awaiting the results of a conditional branch) result in severe penalties, measured in lost execution opportunities.

In this preferred embodiment of the invention, BTB 56 is of the two-level type, and as such operates in combination with multiple pattern history tables 53 for storing prediction codes that are called by branch history information, as described in copending application 60/032,549 (TI-23791P), filed Dec. 10, 1996, entitled "Multiple Global Pattern History Tables for Branch Prediction in a Microprocessor", and incorporated herein by this reference. Selection of the appropriate one of pattern history tables 53 to be used in generating a branch prediction for a particular address is made by select logic 80, according to the type of program in which the branching instruction is contained. As illustrated in FIG. 2, select logic 80 selects from among the pattern history tables 53 in response to information regarding the type of program that contains the current branching instruction, such as communicated on line U/S from code segment register CS; in addition, as shown, the actual fetch address on lines FA may be used in selecting the appropriate pattern history table 53 based upon the memory location of the branching instruction corresponding to the fetch address on lines FA. Bus UPD from graduation queue and tag check circuitry 27 and from the execution units are applied to update logic 70, which in turn updates the branch history in the entries of BTB 56 and the prediction codes stored in pattern history tables 53, in response to the success or failure of branch predictions as evaluated in execution. In this manner, the branch prediction success rate is improved through the use of branch results, and also by taking advantage of similarities in branch behavior exhibited by programs of the same type (e.g., application programs, shared libraries, operating system functions) in the selection of the appropriate pattern history table 53.

In response to branch predictions based upon corresponding prediction codes in pattern history tables 53, BTB 56 presents target instruction addresses to multiplexer 57 on bus BR TRG; return address queue 55 presents return instruction addresses to multiplexer 57 on bus RA. The output of multiplexer 57 is connected to the third input of multiplexer 52, and to multiplexer 58 so that fetch counter 50 may be updated. The three inputs to multiplexer 52 thus present three sources for the next fetch address FA, which is a logical address as opposed to a physical address.

According to the preferred embodiment of the present invention, upon making a branch prediction and issuing a branch target address on bus BR TRG, BTB 56 also presents prefetch addresses and associated control information on buses PF0, PF1 to prefetch control logic 23. The prefetch addresses and control information are contained within the BTB entry for each branch instruction, and are thus issued along with the fetch address for the target of the branch instruction. Prefetch control logic 23 initiates the appropriate prefetches in response to the information received from BTB 56 on buses PF0, PF1, as addresses on buses PFA0, PFA1. Prefetch control logic 23 is constructed of circuitry for generating address and control signals for performing the prefetch operation, and as such will include translation circuitry as necessary, depending upon the nature of the prefetch addresses presented on buses PF0, PF1 and the desired recipient of buses PFA0, PFA1. For example, if the prefetch addresses stored in BTB 56 are logical addresses, prefetch control logic 23 may include a micro-TLB having, for example, on the order of eight entries, for translating these logical prefetch addresses into physical addresses, in which case buses PFA0, PFA1 may be applied directly to level 2 cache 11. Alternatively, prefetch control logic 23 may simply apply the prefetch logical addresses received on buses PF0, PF1 to TLB 19 via buses PFA0, PFA1 to initiate the prefetches. Still further in the alternative, BTB 56 may store physical addresses for the prefetches, in which case prefetch control logic 23 would simply forward the appropriate physical addresses to level 2 cache 11 on buses PFA0, PFA1. In any case, it is contemplated that one of ordinary skill in the art can readily implement the appropriate prefetch control logic 23 as appropriate for the desired architecture given this description. As is evident by the two buses PFA0, PFA1 in FIG. 2, in microprocessor 10 according to the preferred embodiment of the invention, two simultaneous prefetches may be initiated in parallel with a branch target fetch operation.

According to this embodiment of the invention, level 2 cache 11 preferably includes a dual-ported tag array, as is known in the art, so that multiple tag comparison may be performed simultaneously, for example in response to the two simultaneous prefetches issued by prefetch control logic 23 as described. It is contemplated that the data table in level 2 cache 11 is preferably single ported to save chip area, however, considering both the reduced likelihood of simultaneous hits therein, and also considering that any simultaneous hits at this level are not both in a critical path, and may be handled simply by queuing of the requests. Alternatively, level 2 cache 11 may include a single-ported tag array, if queuing of simultaneous prefetches is acceptable from a performance standpoint. TLB 19 may also be dual-ported, if desired, if it is to be used to simultaneously translate two prefetches, especially if prefetch control logic 23 does not include a microTLB.

Figure 3:
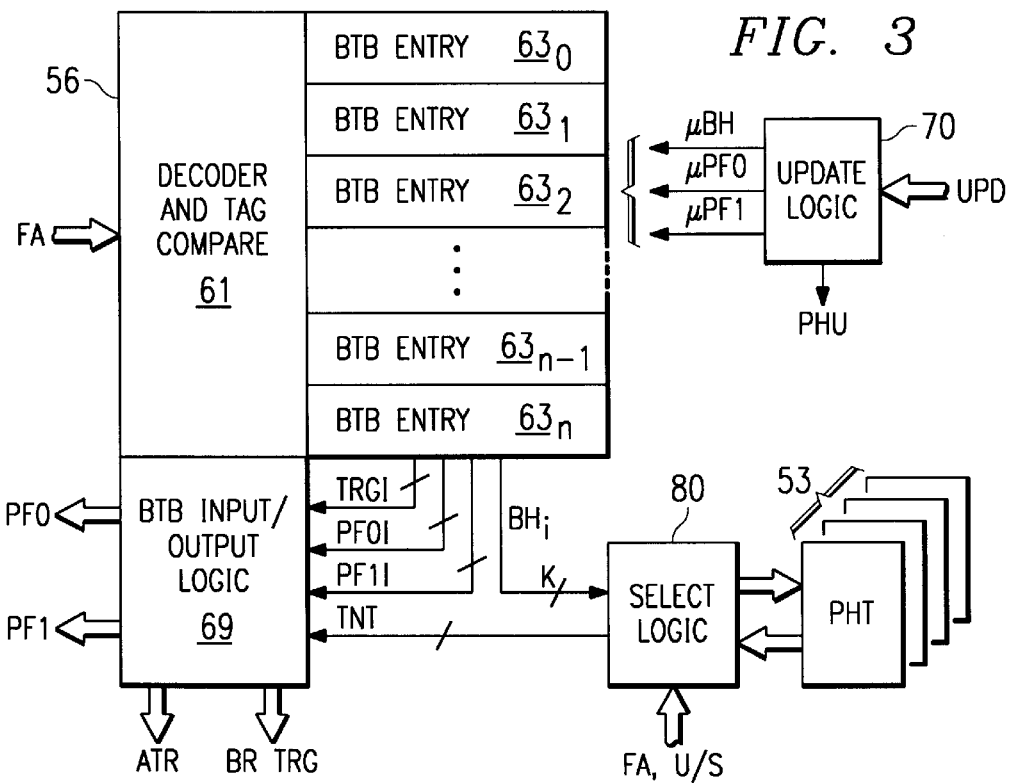
FIG. 3 is an electrical diagram, in block and schematic form, of the branch target buffer, pattern history tables, and associated circuitry in the microprocessor or FIG. 1 according to the preferred embodiment of the invention.

Referring now to FIG. 3, the construction of BTB 56, in combination with an example of select logic 80 and multiple pattern history tables 53, will now be described. BTB 56 in this example is a four-way set-associative cache memory having multiple entries 63; only one way is illustrated in FIG. 3, for the sake of clarity. BTB 56 includes selector 61 that is coupled to receive the fetch address on lines FA, and to select the appropriate entry 63 to which the fetch address points. Selector 61 may be constructed according to any conventional technique for performing the selection of an entry 63 in BTB 56 from the fetch address, such as by way of a decoder, tag comparator, or simple multiplexer.

Figure 4:
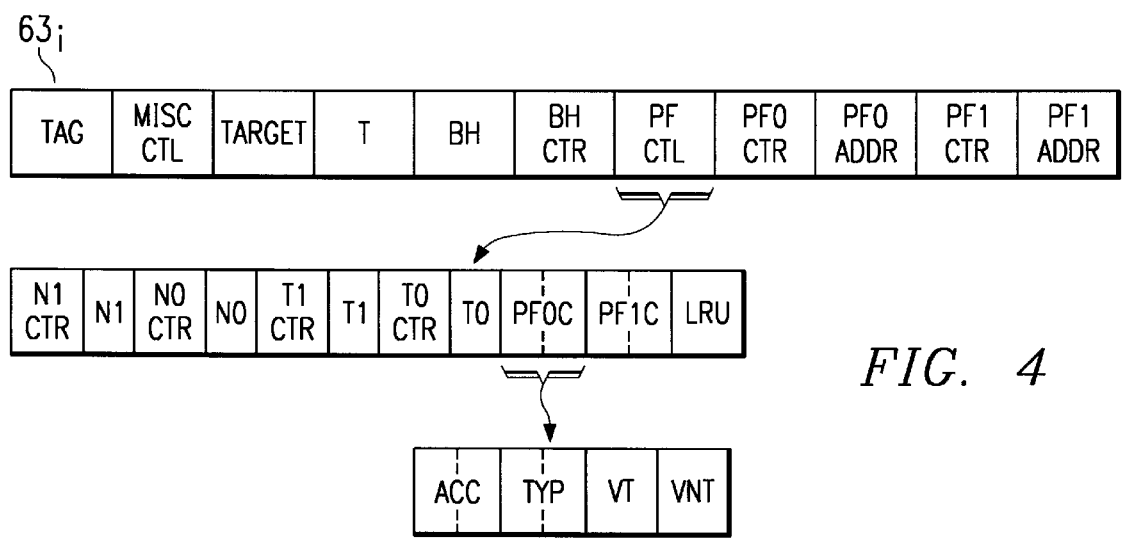
FIG. 4 is an illustration of the contents of an entry in the branch target buffer of FIG. 3 according to the preferred embodiment of the invention.

FIG. 4 illustrates the arrangement of an exemplary entry $63_i$ in BTB 56, it being understood that all entries $63_0$ through $63_n$ are similarly arranged. Entry $63_i$ has a tag field TAG used to identify it with the logical fetch address FA of a specific branching instruction, against which selector 61 matches a portion of the incoming logical fetch address FA. Tag field TAG may directly store selected bits of the logical fetch address FA of its corresponding branching instruction, or may instead correspond to a logical combination of these selected logical address bits, as is known in the art. Typically, tag field TAG will include a line address and an offset indicating the byte offset of the instruction in the fetch line. Entry $63_i$ also includes miscellaneous control bits, such as a valid bit and one or more LRU bits (for multiple-way BTBs), as conventional in the art.

BTB entry $63_i$ also has target field TARGET which contains the logical address of the branch instruction target address. Referring back to FIG. 3, the contents of portion TARGET are forwarded to input/output logic 69 on bus TRGI upon its entry 63 corresponding to a branch instruction predicted as "taken". Referring back to FIG. 2, this address will then be presented to multiplexer 57 on bus BR TRG, as noted above; if the branch is predicted as "not taken", however, merely the next sequential logical address (i.e., the contents of fetch pointer 50) will be selected by multiplexer 52 as the next logical fetch address FA.

Entry $63_i$ also includes a history/subtype selection bit T and a corresponding m-bit branch history field BH. If history/subtype bit T is not set, meaning that the branch instruction identified with entry $63_i$ is not a conditional branch, branch history field BH stores a code indicating the type of unconditional branch (i.e., JUMP, CALL, or RETURN) of the instruction. With history/subtype bit T set, the instruction corresponding to entry $63_i$ is a conditional branch, in which case branch history field BH stores the results of recent branches (i.e., the branch history) of the corresponding instruction. The branch history stored in branch history field BH includes both the actual branch history of the associated branching instruction as determined upon completion of the execution of the instruction, and also speculative branch history consisting of the predicted result for those instances of the branching instruction which have not yet completed execution. In addition, as described in copending U.S. Provisional Application No. 60/020,844 filed Jun. 28, 1996, and incorporated herein by this reference, entry $63_i$ may also include a counter BH CTR that indicates the number of speculative branch history bits in branch history field BH, for use in recovery from a misprediction.

According to this embodiment of the invention, various additional bits are provided with entry $63_i$ (and, of course, all of the entries 63 in BTB 56), that control the nature and locations of prefetches to be performed simultaneously with the fetch of the instruction indicated by target field TARGET thereof. These prefetch fields will now be described for entry $63_i$ relative to FIG. 4.

Entry $63_i$ according to the present invention includes the necessary fields to prefetch instructions and data. As will be described in further detail hereinbelow, the target addresses of these prefetches are determined by subsequent instructions in the pipeline, particularly those that relate to the targets of later branches and also to those which were cache misses when first executed. According to this embodiment of the invention, two prefetches from arbitrary memory addresses may be simultaneously effected, and as such two prefetch fields PF0, PF1 are included within entry $63_i$, control information for which is provided within prefetch control portion PF CTL of entry $63_i$. As illustrated in FIG. 4, prefetch control portion PF CTL includes control portions PF0C, PF1C, each of which control the access, type, and occurrence of an associated prefetch (if any) to be performed. For example, each of control portions PF0C, PF1C include access portion ACC, and prefetch type portion TYP, each of which have two bits, that may be coded as follows:

| PF0C or PF1C ACC/TYP | Access type | Access type |
| --- | --- | --- |
| 00/XX | Invalid (i.e., no prefetch) | N/A |
| 01/00 | Valid instruction prefetch fetch address | Instruction |
| 10/01 | Valid data prefetch address | Data fetch |
| 10/10 | Valid data prefetch address | Store preparation |
| 10/11 | Valid data prefetch address | Data fetch and store preparation |
| 11/XX | Valid address, both instruction and data | Data and instruction fetch |

In the above coding, the term "store preparation" refers to the operation by way of which a particular memory block is prepared to accept a write operation thereto. Data prefetching according to the preferred embodiment of the invention may thus be performed so as to either (or both) retrieve a block of data or prepare the block to receive a write. The other combinations of codes for access portion ACC and type portion TYP are not defined in this example.

According to the preferred embodiment of the present invention, each of control portions PF0C, PF1C also include an enable portion consisting of bits VT, VNT, as shown in FIG. 4. Bits VT, VNT indicate, when set, that their associated prefetch is enabled when the corresponding branching instruction to entry 63$_i$ is predicted as taken and not taken, respectively. For example, if neither of bits VT, VNT are set, the associated prefetch is not enabled for either prediction, if both of bits VT, VNT are set, the associated prefetch is enabled for either prediction, and, of course, if one of bits VT, VNT is set to the exclusion of the other, the associated prefetch is enabled for the corresponding prediction and disabled for the other. Accordingly, the inclusion of bits VT, VNT provide an additional control feature such that the prefetches may be selectively enabled according to the predicted program flow.

As indicated by the above coding, each of the two prefetches (PF0, PF1) may be for instruction or data, or both; furthermore, as two prefetch control portions PF0C, PF1C are provided, the two prefetches may operate independently fetch from one another. Prefetch control portion PF CTL of entry 63$_i$ further includes least-recently used bit LRU, which indicates which of the two prefetches currently set up therein is older, similarly as an LRU bit in a two-way cache; in the event that a different prefetch is to be enabled, least-recently used bit LRU points to the one of prefetches PF0, PF1 that is to be overwritten with the new prefetch information.

Entry 63$_i$ further includes prefetch address portions PF0 ADDR, PF1 ADDR that store the memory addresses to be prefetched. In addition, according to this embodiment of the invention, entry 63$_i$ also includes prefetch counters PF0 CTR, PF1 CTR, which are associated with the prefetches PF0, PF1, respectively. Prefetch counters PF0 CTR, PF1 CTR are small counters, such as two-bit counters, that maintain information regarding the results of the prefetch; of course, prefetch counters PF0 CTR, PF1 CTR may be larger counters if further granularity in the cache history of the prefetches is desired. In this embodiment of the invention, prefetch counters PF0 CTR, PF1 CTR are each incremented in response to their associated prefetch being a level 2 cache miss and thus requiring access to main memory 305. Conversely, prefetch counters PF0 CTR, PF1 CTR are decremented each time that the associated prefetch is unnecessary, as the sought-for data or instructions are already in cache; upon a prefetch counter PF0 CTR, PF1 CTR reaching zero, its control bits PF0C, PF1C in prefetch control portion PF CTL are set to the invalid state (00), permitting a new prefetch to be set up therein.

As noted in the above description, entry 63$_i$ includes the appropriate entries so as to prefetch instructions or data from arbitrary memory addresses. Of course, the operation of many typical programs involves the execution of instructions from stored in memory in sequential locations. According to the preferred embodiment of the invention, therefore, prefetch control portion PF CTL of entry 63$_i$ also includes implied prefetch enable bits T0, T1, N0, N1 for enabling prefetches of cache lines using the branch target address stored in target field TARGET (for taken branches) or the next sequential address (for not-taken branches) as implied prefetch addresses. In this embodiment of the invention, prefetch enable bits T0, T1 are associated with branches predicted as taken, and prefetch enable bits N0, N1 are associated with branches predicted as not taken.

As is well known in the art, cache memories are loaded by units of data referred to as "cache lines", which are larger than typical memory accesses so as to provide the local storage of neighboring data. For example, the size of a cache line in unified level 2 cache 11 in FIG. 1 is thirty-two bytes, which corresponds to eight data words. However, a particular instruction may be located near the end of a cache line, such that a successive instruction that closely follows the instruction may not be in the cache when needed, in which case the fetch of one of the successive instructions will likely result in a cache miss. According to this preferred embodiment of the invention, prefetch enable bits T0, T1, N0, N1 in prefetch control portion PF CTL of entry 63$_i$ permit the prefetching of one or two cache lines following the target address (for bits T0, T1, respectively) or one or two cache lines following the next sequential instruction in program order (for bits N0, N1, respectively). Of course, more or fewer prefetch enable bits may be provided in entry 63$_i$, with or without the association with the branch prediction as in this example, depending upon the architecture.

Specifically, for branches predicted as taken, bit T0, when set, effects the prefetch of the next cache line after that of the branch target, and bit T1, when set, effects the prefetch of the second cache line after that of the branch target; similarly, for branches predicted as not-taken, bit N0, when set, effects the prefetch of the next cache line after that containing the next sequential instruction, and bit N1, when set, effects the prefetch of the second cache line after that containing the next sequential instruction. It is contemplated that only one cache line prefetch is permitted from these implied cache addresses; for example, if both of bits T0, T1 are set, only the first cache line after the branch target will be prefetched. According to this embodiment of the invention, therefore, the first or second next cache lines beyond that associated with the branch target address or the next sequential address may be prefetched, for both predicted states of conditional branch instructions. The size of entry 63$_i$ is also maintained relatively small, as the addresses associated with these prefetches is implied from the branch target.

Also according to this embodiment of the invention, prefetch counters T0 CTR, T1 CTR, N0 CTR, N1 CTR are associated with prefetch enable bits T0, T1, N0, N1, respectively. Prefetch counters T0 CTR, T1 CTR, N0 CTR, N1 CTR operate similarly as prefetch counters PF0 CTR, PF1 CTR described hereinabove, as they store a count value that corresponds to whether the associated prefetch, when performed the last two times, resulted in cache misses or cache hits. As in the case of prefetch counters PF0 CTR, PF1 CTR, prefetch counters T0 CTR, T1 CTR, N0 CTR, N1 CTR may be constructed of more than two bits, if desired. Also as in the case of prefetch counters PF0 CTR, PF1 CTR, prefetch counters T0 CTR, T1 CTR, N0 CTR, N1 CTR are incremented upon the associated prefetch being a cache miss, and decremented upon the associated prefetch being a cache miss. Upon the contents of prefetch counters T0 CTR, T1 CTR, N0 CTR, N1 CTR reaching zero, the prefetch associated therewith is preferably ignored (as the sought-for contents are most likely already in lower level cache, rendering the prefetch unnecessary).

Other alternative prefetch control fields may be utilized within the present invention. For example, either or both of the addressed prefetch fields PF0 ADDR, PF1 ADDR need not be associated with a branch prediction, but instead prefetched upon each instance of the fetch address matching the corresponding tag field TAG of entry $63_i$. Further in the alternatively, more or fewer prefetch fields could be provided in connection with entry $63_i$, depending upon the amount of prefetch that may be handled by the architecture and upon the cache hit success rate. It is contemplated that such alternative implementations will be apparent to one of ordinary skill in the art having reference to this specification.

Referring back to FIG. 3, the operation of BTB 56 according to the preferred embodiment of the invention will now be briefly described. Upon receiving a fetch address corresponding to a branching instruction on lines FA, selector 61 determines if any of its entries 63 has a TAG portion that matches the fetch address of the branching instruction, in the conventional manner. Of course, this tag comparison is made in a set associative manner, if BTB 56 is so constructed. If no matching tag field TAG is present for the branching instruction (e.g., if this is the first instance of the branching instruction), BTB 56 does not make a prediction and indicates the same on lines ATR from input/output logic 69, in which case selection of the next fetch address is made statically. Such operation of BTB 56 is according to conventional techniques.

For conditional branching instructions for which the fetch address matches the tag portion TAG of an entry 63 in BTB 56, k bits of the branch history field BH of the matching entry 63 are provided to PHTs 53. Through the operation of select logic 80, which selects the appropriate one of PHTs 53 according to the class of program with which the branching instruction is associated, a branch prediction code is provided on lines TNT to BTB input/output logic 69, along with the branch target address from target field TARGET from the matching entry 63 on lines TRGI. BTB input/output logic 69 provides a branch target address on bus BR TRG to multiplexer 57 (FIG. 2) corresponding to the value on lines TRGI for branches predicted as taken; a control signal (not shown) is generated for branches predicted as not taken, so that multiplexer 52 selects the output of fetch pointer 50 as the next fetch address. For unconditional branching instructions that have a matching entry 63 in BTB 56, and for which the prediction is always "taken", the target address in target field TARGET for that entry is presented on bus TRGI and issued by BTB input/output logic as a branch target address on bus BR TRG. In any case, whether the branch is predicted as taken or not, fetch of the next expected instruction begins with the presentation of the new fetch address in the next cycle.

For all branches (whether predicted as taken or not), control flags and attributes of the branching instructions are presented on bus ATR to instruction buffer and control 60, for forwarding with the branch instruction along the pipeline. These control flags and attributes include tags that are set to indicate that the instruction is a branch; in addition, flags will also be set for non-branch instructions to identify those that are the targets of branches, to identify whether a cache miss occurred in relation to each instruction, and also preferably indicating whether the cache miss was in relation to an instruction or a data access. As will be described in further detail hereinbelow, prefetches will be set up and controlled based upon the evaluation of these instruction tags upon graduation of the instruction from the execution and writeback pipeline stages.

According to the preferred embodiment of the invention, each branching instruction that has a corresponding entry 63 in BTB 56 may also initiate one or more prefetches in combination with the fetch of the next instruction (either the next sequential address or the branch target, depending upon the prediction). The prefetch addresses and control information are contained within the BTB entry for each branch instruction, and are thus issued along with the fetch address for the target of the branch instruction. As noted above relative to FIG. 4, this prefetch may include a prefetch of the next one or more cache lines from that of the current target address (under the control of prefetch bits T0, T1, N0, N1 in prefetch control portion PF CTL), or may include a prefetch of instructions or data based upon the addresses stored in portions PF0, PF1 of entry $63_i$. It is contemplated that the prefetches using implied addresses (i.e., those indicated by prefetch bits T0, T1, N0, N1 in prefetch control portion PF CTL) will have priority over the prefetches associated with address fields PF0 ADDR, PF1 ADDR, as it is likely that the cache lines following the branch target address will be needed prior to the instructions or data from the addresses stored in prefetch fields PF0 ADDR, PF1 ADDR.

In any case, BTB input/output logic 69 presents memory addresses (whether implied from the branch target or stored in the matching entry $63_i$) on buses PF0, PF1. Prefetch control logic 23 in turn initiates the appropriate prefetches, in response to the information received from BTB 56 on buses PF0, PF1, as logical addresses on buses PFA0, PFA1 that are applied to TLB 19 to initiate memory accesses. As is evident by the two buses PFA0, PFA1 in FIG. 2, in microprocessor 10 according to the preferred embodiment of the invention, two simultaneous prefetches may be initiated in parallel with a branch target fetch operation in the case where level 2 cache 11 includes dual-ported tag comparators.

Figure 5:
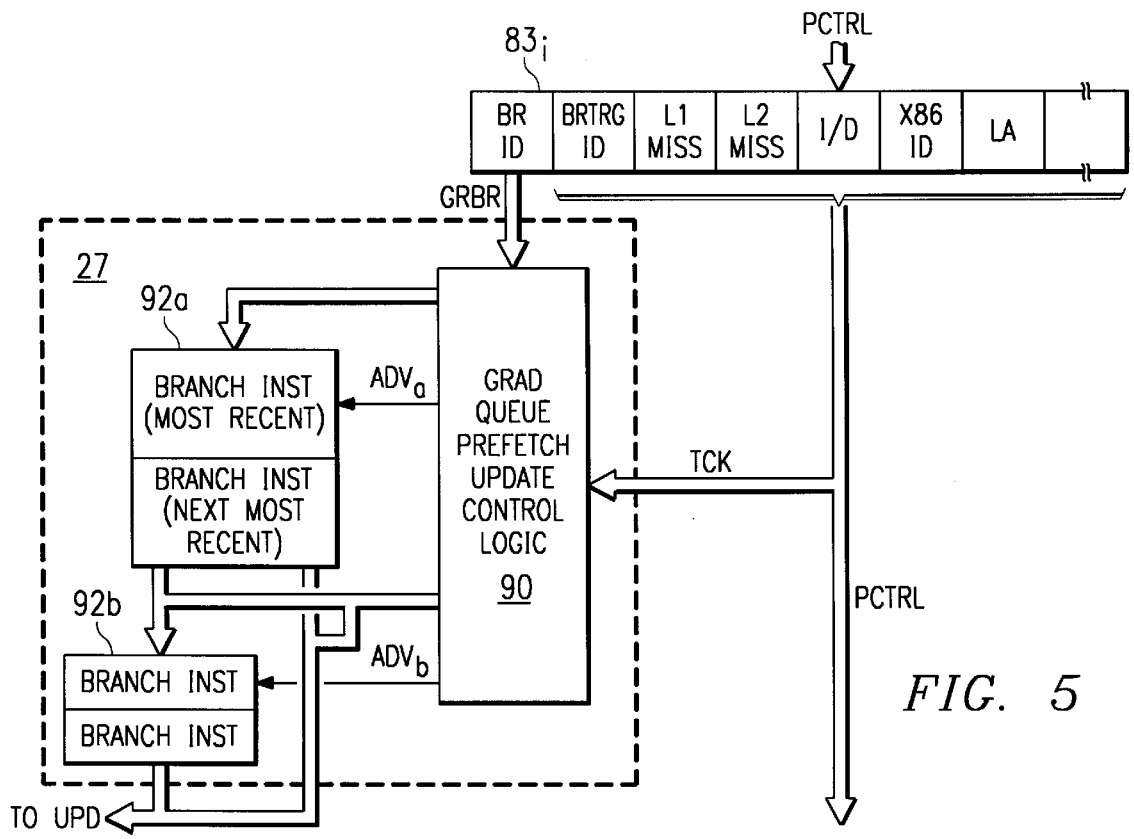
FIG. 5 is an electrical diagram, in block form, of the construction of graduation queue and tag check circuitry in the microprocessor of FIG. 1 according to the preferred embodiment of the invention.

Referring now to FIG. 5, the construction and operation of graduation queue and tag check circuitry 27 according to the preferred embodiment of the invention will now be described. The overall function and purpose of graduation queue and tag check circuitry 27 is to interrogate instructions as they complete their execution and writeback stages (i.e., "graduate" from the pipeline), and to establish and modify entries 63 in BTB 56 according to such interrogation so that efficient prefetch may be performed.

FIG. 5 illustrates entry 83$i$, which corresponds to multiple bits of control information associated with an instruction as it progresses along the pipeline; for the sake of illustration, these multiple bits are referred to as bus PCTRL, as they correspond to control information in the pipeline. As is well known in the art for pipelined microprocessors, each instruction is tagged with control information or signals as it progresses along the pipeline that identify the instruction (as decoded), its type, exception information, and the like. Entry 83i of FIG. 5 includes such conventional information, along with additional control tags useful in connection with the preferred embodiment of the present invention as will now be described.

As illustrated in FIG. 5, entry 83i includes instruction identifier x86 ID, which in this example is the conventional code that identifies the x86 instruction (rather than the AOp) associated with the current instruction; other conventional control tags and information are also provided in entry 83i. In addition, entry 83i includes fetch tag LA that indicates the logical (or, alternatively, physical) memory address of the fetch made for its associated instruction. According to the preferred embodiment of the present invention, entry 83i also includes branch identifier tag BR ID, which indicates whether the associated instruction is a branch instruction and, if so, provides an identifying code specific to that branch. Similarly, each entry 83i includes branch target identifier tag BRTRG ID, which indicates whether the associated instruction is the target of a branch and, if so, the identifying code of the branch of which it is a target. In this way, interrogation of entry 83i can identify targets of specific branch instructions as they are completed. While entry 83i need not include branch target identifier tag BRTRG ID in an in-order microprocessor, branch target identifier tag BRTRG ID is required in an out-of-order microprocessor.

Entry 83i according to this embodiment of the invention also includes tags indicative of whether cache misses were involved in their fetching, and their type. As described above relative to FIG. 1, microprocessor 10 and system 300 include various levels of cache memory, from level 0 microcache 18 to level 2 on-chip cache 11, and also possibly external cache memory 307. Entry 83i includes cache miss tags L1 MISS, L2 MISS, that indicate whether the fetch of the associated instruction involved cache misses at the L1 and L2 levels, respectively; an additional cache miss tag may alternatively be provided to indicate if a cache miss occurred relative to external cache memory 307. Consistent with the cache hierarchy of microprocessor 10 and system 300, the setting of a higher level cache miss tag will also indicate that all lower level cache accesses were also misses; for example, cache miss tag L2 MISS will only be set if lower level cache miss tag L1 MISS is also set, as the determination of whether an access is a miss at a higher level will be made if only accesses to all lower level cache accesses are also misses. Entry 83i also includes type bit I/D that indicates whether a cache miss was relative to instruction cache $16_i$ or data cache $16_d$.

The information in each entry 83 as communicated along control pipeline bus PCTRL is received by graduation queue and tag check circuitry 27 following execution and writeback of the associated instruction. As illustrated in FIG. 5, graduation queue and tag check circuitry 27 includes graduation queue prefetch update control logic 90, in combination with two branch queues 92a, 92b. Branch queues 92a, 92b are conventional FIFO queues that store control information for branching instructions that have "graduated" from the pipeline. As will become apparent hereinbelow, since a branch instruction is eliminated from branch queue 92a upon graduation of the target of the next successive branch instruction in microprocessor 10 according to the preferred embodiment of the invention, branch queue 92a contains only two entries; in an out-of-order microprocessor, however, branch queues 92a, 92b each will preferably have more than two entries.

Graduation queue prefetch update control logic 90 is sequential or combinational logic for interrogating the various fields of entries 83 for graduating instructions, for controlling the advance of branch instructions along branch queues 92a, 92b, and for updating the various control bits, in the manner described hereinbelow. As evident in FIG. 5, graduation queue and tag check circuitry 27 generates control signals that are passed to update bus UPD, in combination with conventional branch prediction results and other information by way of which BTB 56, PHTs 53, and the like are updated following instruction execution. It is contemplated that the construction of graduation queue prefetch update control logic 90 can be readily constructed, for a particular architecture, by one of ordinary skill in the art having reference to this description.

Figure 6:
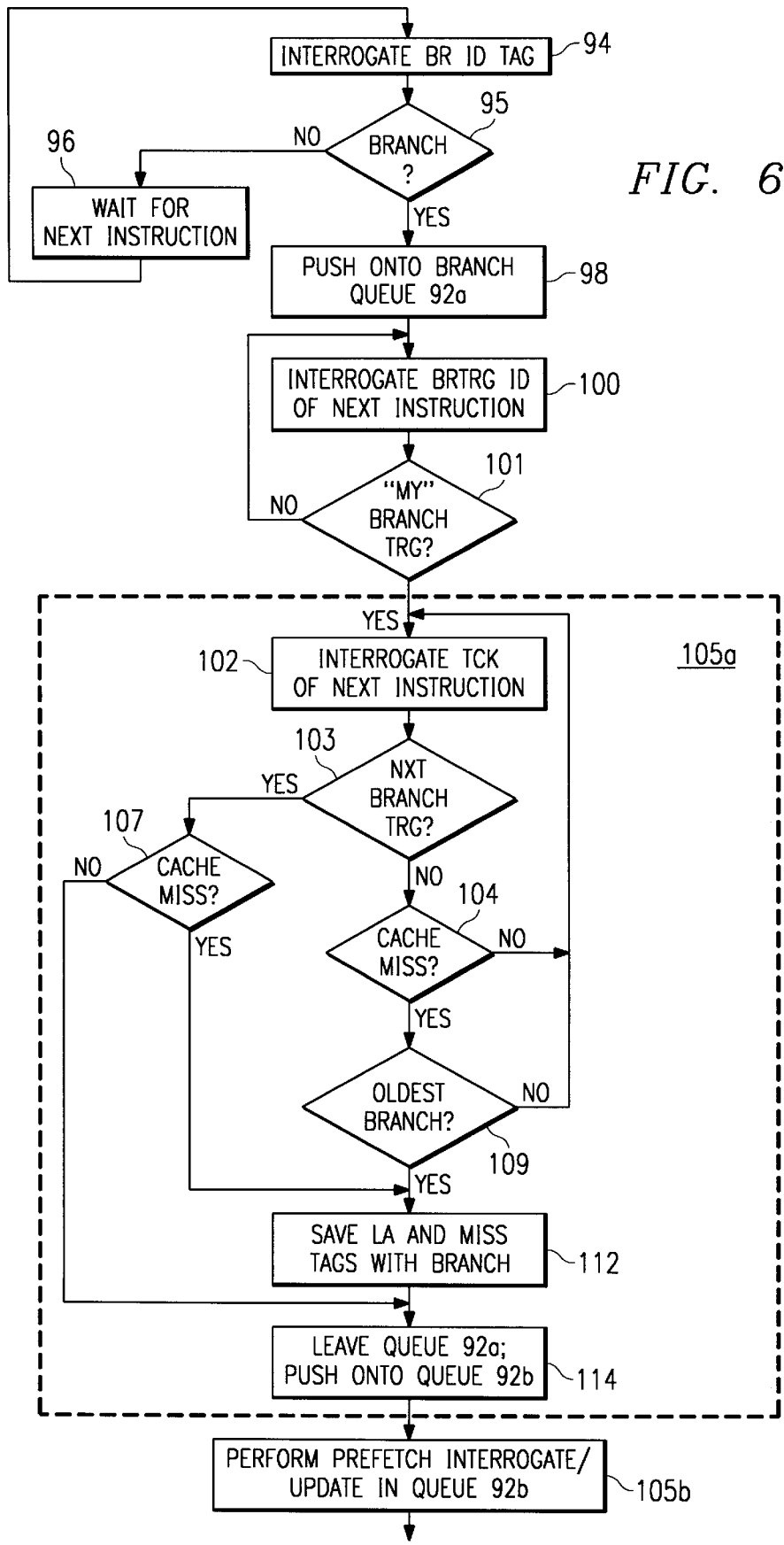
FIG. 6 is a flow chart illustrating the operation of the graduation queue and tag check circuitry of FIG. 5 according to the preferred embodiment of the invention.

Referring now to FIG. 6, the operation of graduation queue and tag check circuitry 27 according to the preferred embodiment of the present invention will now be described in detail. The operation of graduation queue and tag check circuitry 27 illustrated in FIG. 6 is presented for a single branch instruction (referred to as herein as branch instruction $I_x$); it is therefore to be understood that the same process will be operating in parallel for multiple branch instructions that have graduated and are awaiting prefetch information, as appropriate.

The generation of prefetch information begins with process 94, in which graduation queue prefetch update control logic 90 interrogates branch identifier tag BR ID in a recently graduated instruction (communicated thereto along bus GR BR as shown in FIGS. 1 and 5), to determine if the most recently graduated instruction is a branching instruction in decision 95. If the most recently interrogated branch identifier tag BR ID indicates that its instruction was not a branch (decision 95 is NO), control passes to process 96 to wait for the next instruction, upon which process 94 is repeated to again interrogate branch identifier tag BR ID.

Upon decision 95 determining that the most recently graduated instruction is a branch (in this example, upon branch instruction $I_x$ being interrogated, such that decision 95 is YES), the graduated branch instruction $I_x$ (i.e., control information pertaining thereto) is pushed onto branch queue 92a, to await the arrival of possible prefetch addresses and instructions from later instructions in the pipeline. Once branch instruction $I_x$ is placed on branch queue 92a, process 100 is next performed to interrogate the branch target identifier tag BRTRG ID; decision 101 determines if the interrogated instruction is the branch target of the current branch instruction that was placed onto branch queue 92a. If not (decision 101 is NO), process 100 is repeated for each successively graduated instruction thereafter.

Upon decision 101 determining that the instruction corresponding to the branch target of branch instruction $I_x$ has graduated, analysis for possible prefetches upon the next fetch of branch instruction $I_x$ is activated; according to the process illustrated in FIG. 6, prefetch interrogate/update process 105a for branch instruction $I_x$ in prefetch queue 92a is performed. Process 105a begins with process 102, in which the states of the various tags on bus TAG CK for entry 83 of each graduating instruction are analyzed and interrogated by graduation queue prefetch update control logic 90 in graduation queue and tag check circuitry 27.

According to this embodiment of the invention, prefetches are associated with branching instructions for later instructions that correspond to the target of the next branch in the program, and that involve cache misses. According to this embodiment of the invention, each graduated branch instruction (e.g., branch instruction $I_x$) is maintained in branch queue 92a until the target of the next branch is reached, or until a cache miss is detected; similarly, each instruction leaving branch queue 92a is then maintained in branch queue 92b until the target of the next branch is reached (if not already reached), or until a cache miss is detected, or until the instruction has advanced along the full length of branch queue 92b and is popped out by a new branch instruction. After reading of the appropriate tags, decision 103 determines whether the most recently graduated instruction is the target of a branch instruction, specifically the next branch following branch instruction $I_x$. If not (decision 103 is NO), decision 104 is then performed to determine if the most recently graduated instruction involved a cache miss of any length. If decision 104 is NO, control returns to process 102 in which bus TCK is interrogated for the next graduating instruction.

A positive result for decision 103 means, as noted above, that the most recently graduated instruction is a branch target for the branch instruction following branch instruction $I_x$ in the pipeline (i.e., its branch target identifier tag BRTRG ID is set, and points to that next branch instruction). In this event, cache miss tags L1 MISS, L2 MISS, and type bit I/D are analyzed in decision 107 to determine if the fetch of this branch target resulted in a cache miss at any level. If so (decision 107 is YES), graduation queue and tag check circuitry 27 concludes that a prefetch of the instructions associated with this branch target may be useful upon the next instance of branch instruction $I_x$, and as such, in process 112, saves the logical address field LA of entry 83 for this target instruction, along with the state of its miss tags L1 MISS, L2 MISS, and type bit I/D in combination with the control information for branch instruction $I_x$. If the cache miss is an instruction cache miss from an address in the next one or two cache lines from the target (taken or not taken) of branch instruction $I_x$, process 112 will associate the cache miss with the appropriate prefetch enable bits T0, T1, N0, N1 for enabling prefetches of cache lines using the branch target address. Branch instruction $I_x$ is then advanced from branch queue 92a into branch queue 92b in process 114, for determination if an additional prefetch may be associated therewith. If, on the other hand, the target of the next branch instruction did not involve a cache miss (decision 107 is NO), a prefetch of the target would not be useful and thus process 114 is performed directly, removing branch instruction $I_x$ from branch queue 92a and pushing it into branch queue 92b.

In the event that the most recently graduated instruction was not a branch target of the next branch (decision 103 is N0), but did involve a cache miss (decision 104 is YES), decision 109 is next performed to determine if the entry for branch instruction $I_x$ in branch queue 92a is the oldest. If so, process 112 is performed in conjunction with branch instruction $I_x$ to associate a prefetch to the address specified by fetch tag LA of entry 83 of the most recently graduated instruction, along with the appropriate control information regarding the prefetch (i.e., state of the miss tags, indication of whether the prefetch is of data or instructions, setting of the taken and not taken indicators, and the like). Process 114 is then performed to move branch instruction $I_x$ from branch queue 92a into branch queue 92b, to await any other appropriate prefetch that may be desired.

In the event that branch instruction $I_x$ is not the oldest branch instruction in queue 92a at the time that a non-branch target cache miss graduates (decision 109 is NO), the association of the prefetch is made relative to the branch instruction in queue 92a that is the oldest; graduation queue prefetch update control logic 90 then advances each of the entries in branch queue 92a accordingly. In this case, decision 111 is necessarily NO, and thus branch instruction $I_x$ remains in branch queue 92a to await the next graduated instruction.

Following process 114, regardless of whether branch instruction $I_x$ was moved from branch queue 92a by receiving the next branch target instruction or by being associated with a cache miss, prefetch interrogate/update process 105b for branch instruction $I_x$ in prefetch queue 92b is then performed. Prefetch interrogate/update process 105b is identical to prefetch interrogate/update process 105a, except that a second prefetch may be associated with branch instruction $I_x$ thereby. Of course, the same conditions that trigger a prefetch association for an instruction in branch queue 92b will also cause such an association with an instruction in branch queue 92a; as such, multiple prefetch associations for the same cache miss may be made, according to the preferred embodiment of the invention. Branch instruction $I_x$ remains in branch queue 92b again until the branch target of the next branch graduates (if this has not yet occurred), until a cache miss is encountered, or until it is popped out from branch queue 92b by the addition of another instruction thereto when full.

Referring back to FIGS. 1 and 5, upon branch instruction $I_x$ leaving branch queue 92b, its control information along with the prefetch address and associated control information is communicated back to update logic 70 on bus UPD along with the results of its branch prediction and other information regarding the execution and completion of branch instruction $I_x$.

Figure 7:
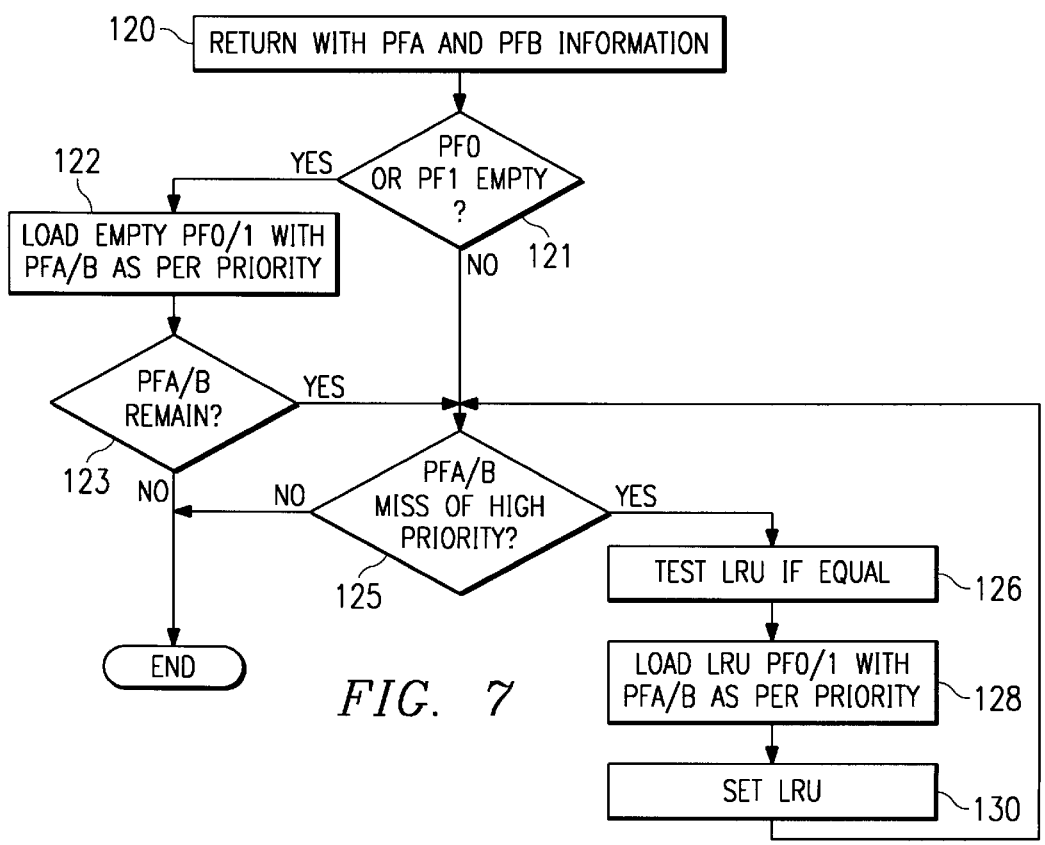
FIG. 7 is a flow chart illustrating the operation of update logic in the branch target buffer of FIG. 3 according to the preferred embodiment of the invention.

Update logic 70 receives the prefetch information along with the identification and control information for branch instruction $I_x$ from graduation queue and tag check circuitry 27 on bus UPD, and updates the corresponding entry 63 in BTB 56 to update the prefetch fields as appropriate. Referring now to FIG. 7, an example of an updating process performed by update logic 70 to update BTB 56 to include this prefetch information will now be described.

In process 120, update logic 70 receives the control and address information on bus UPD from graduation queue and tag check circuitry 27 for branch instruction $I_x$. As described hereinabove, according to this embodiment of the invention, this information may include address and control information for two general address prefetches (referred to in FIG. 7 as prefetches PFA, PFB, corresponding to prefetches generated in branch queues 92a, 92b, respectively); in addition, this information may include address and control information for an implied address prefetch under the control of prefetch enable bits T0, T1, N0, N1. Of course, the information on bus UPD also includes identification information regarding branch instruction $I_x$, so that update logic 70 can select the proper entry 63 in BTB 56 for this instruction, also in process 120. The results of any branch prediction are also provided on bus UPD at this time, for updating by update logic 70 in the conventional manner.

Decision 121 interrogates the entry 63 in BTB 56 that is associated with branch instruction $I_x$ to determine if either of its prefetch fields (PF0, PF1) are empty. Referring back to FIG. 4, decision 121 may be performed by interrogating the prefetch access portion ACC of prefetch control bits PF0C, PF1C in prefetch control portion PF CTL of the corresponding entry 63, to determine if either or both contains an invalid (00) code. In the case of an implied address prefetch, the counters T0 CTR, T1 CTR, N0 CTR, N1 CTR, are interrogated to determine if any are set to zero. If none of these conditions are true (decision 121 is NO), control passes to decision 125 as will be described hereinbelow; if decision 121 is YES, the empty prefetch fields PF0, PF1 may receive the address and control information for one of the newly received prefetches PFA, PFB.

In process 122, therefore, the empty ones of prefetch fields PF0, PF1 in entry 63 are loaded. Specifically, the logical address (or physical address, as the case may be) of one of the prefetches PFA, PFB identified by graduation queue and tag check circuitry 27 is stored in the appropriate one of address fields PF0 ADDR, PF1 ADDR, and the corresponding control bits PF0C, PF1C are set to indicate whether the prefetch is of instruction or data (or both); in the case of an implied address prefetch, the corresponding prefetch enable bits T0, T1, N0, N1 are enabled. In the event that only one of the BTB prefetch fields is empty as determined by decision 121 and that two possible new prefetches PFA, PFB are available, process 122 is preferably performed according to a predetermined priority scheme. For example, the state of the cache miss tags L1 MISS, L2 MISS may be used to determine the priority of prefetches PFA, PFB relative to one another. In this case, the one of new prefetches PFA, PFB having a higher level cache miss (e.g., a cache miss at level 2 cache 11 is a higher level cache miss than a cache miss at level 1 cache $16_i$) is loaded into the empty prefetch field PF0, PF1 of entry 63 of BTB 56 for branch instruction $I_x$. Alternatively, prefetch PFA (i.e., the first, or nearest, prefetch defined by graduation queue and tag check circuitry 27) may always have priority, as it is the nearest in program order to the corresponding branch instruction $I_x$. Following process 122, decision 123 is performed to determine if a new prefetch PFA, PFB remains to be loaded into entry 63 (but there being no empty entry PF0, PF1 therefor). If not, updating is complete; if so (decision 123 is YES), decision 125 is next performed.

According to this preferred embodiment of the present invention, decision 125 determines if any of the remaining new prefetches PFA, PFB may be loaded into entry 63 for branch instruction $I_x$, for example by being of a high priority such as an external cache miss. Decision 125 thus preferably compares cache miss tags L1 MISS, L2 MISS against the value of prefetch counters PF0 CTR, PF1 CTR, to determine if any of the prefetches are of high enough priority so as to be substituted for the current contents of a prefetch field PF0, PF1. For example, a level 2 cache miss may be assigned to have a higher priority than an existing prefetch with a counter value of 10, 01, or 00, while a level 1 cache miss may be assigned to have a higher priority than an existing prefetch with a counter value of 01 or 00. If so (decision 125 is YES) and if the values of the two prefetch counters PF0 CTR, PF1 CTR are equal, update logic 70 tests the LRU bit of prefetch control portion PF CTL of entry 63 in process 126 to determine which of the prefetches PF0, PF1 was most recently loaded, and loads the appropriate address for the new high priority prefetch PFA, PFB into the least recently used prefetch field PF0, PF1 in process 128. The value of the associated counter PF0 CTR, PF1 CTR is initialized to a middle value, such as 10, considering that its prior access was a cache miss. Of course, if the values of prefetch counters PF0 CTR, PF1 CTR are not equal, the prefetch field PF0, PF1 with the lowest priority receives the new information. The LRU bit is then set in process 130 for this prefetch field, and decision 125 is then performed to determine whether to load another new prefetch PFA, PFB into the other field, if appropriate.

Upon the remaining new prefetches PFA, PFB being of insufficient priority to be substituted into entry 63 of BTB 56 (decision 125 is NO), the updating of BTB 56 by update logic 70 for purposes of initiating prefetches is complete.

In operation, referring now to FIG. 8, once entry 63 is updated as described hereinabove, prefetches are performed by BTB 56 in combination with prefetch control logic 23. The operation begins with process 132, in which selector and tag comparator 61 of BTB 56 (FIG. 3) compares the fetch address of each new instruction with the contents of tag fields TAG in BTB 56. Process 132 is repeated so long as no match is detected in decision 133. Once a matching fetch address on lines FA (FIGS. 2 and 3) is received (decision 133 is YES), which presumably indicates that the same branching instruction is to be fetched, process 134 is performed to generate the appropriate branch target address for the branching instruction. In the event of an unconditional branch, target field TARGET of matching entry 63 serves as the branch target address. Conditional branches have their outcome predicted by BTB 56 in combination with PHTs 53 as described hereinabove, selecting either target field TARGET of matching entry 63 as the branch target address for branches predicted as taken, or the next sequential fetch address for branches predicted as not taken. The branch target address in either case is then used as the next fetch address on lines FA, and in process 136 is applied to μTLB 22 and then to level 1 instruction cache $16_i$ to fetch the next instruction, as described hereinabove and as conventional in the art.

Figure 8:
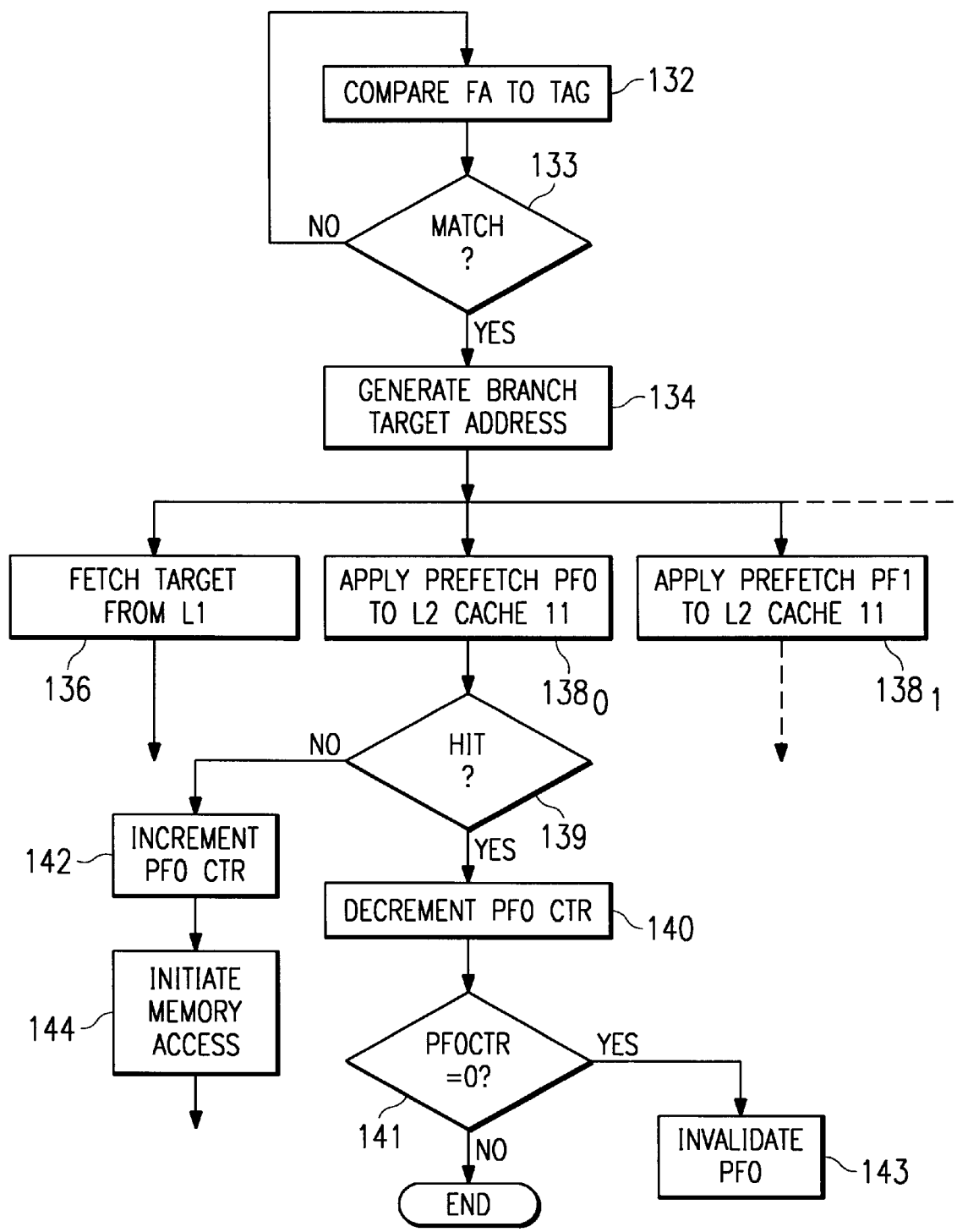
FIG. 8 is a flow chart illustrating the operation of prefetch control logic in the microprocessor of FIG. 1 according to the preferred embodiment of the invention.

According to the preferred embodiment of the present invention, the prefetches that are indicated in matching entry 63 are performed by prefetch control logic 23 in parallel with the fetch of the next instruction in process 136, as illustrated in FIG. 8. Among themselves, prefetches corresponding to prefetch address fields PF0 ADDR, PF1 ADDR, and prefetches using the implied cache line addresses indicated by prefetch bits T0, T1, N0, N1 in prefetch control portion PF CTL, may be performed in parallel if the internal bandwidth permits, or may instead be performed sequentially according to a priority scheme. For example, prefetches using the implied cache line addresses relative to the branch target (i.e., the prefetches according to prefetch bits T0, T1, N0, N1) may have the highest priority, as they pertain to instructions that may be executed shortly after the target of the branch, and as such are preferably accessed and placed into low level cache (e.g., level 1 instruction cache $16_i$) soon. According to the preferred embodiment of the invention, prefetch control logic 23 determines the order and priority of the various prefetches.

For prefetches as determined by graduation queue and tag check circuitry 27, and as stored in prefetch fields PF0, PF1 of matching entry 63, processes $138_0$, $138_1$ are illustrated as performed in parallel in FIG. 8, in which prefetch control logic 23 applies the contents of address fields PF0 ADDR, PF1 ADDR directly or indirectly to level 2 cache 11 (i.e., directly as physical addresses, or indirectly through TLB 19). As noted above, processes $138_0$, $138_1$ may be performed sequentially, if desired, under the control of prefetch control logic 23. By way of explanation, the operation of microprocessor 10 in performing the prefetch PF0 will now be described, it being understood that prefetch of the address specified in field PF1 ADDR will be similarly performed.

In process $138_0$, the contents of address field PF0 ADDR are applied to level 2 cache 11 by prefetch control logic 23 in the manner described above, either directly if these contents correspond to a physical address or by way of TLB 19 if these contents correspond to a logical address. In decision 139, conventional tag comparator circuitry in level 2 cache 11 determines if the data or instructions to be prefetched according to the address of PF0 ADDR are present therein (i.e., cache hit or cache miss). If a cache miss (decision 139 is NO), prefetch control logic 23 increments the contents of counter PF0 CTR in process 142, and the memory access to external cache 307, or main memory 305, as the case may be, commences in the usual manner. In this event of a level 2 cache miss, the prefetch requested by prefetch control logic 23 according to the address in prefetch field PF0 of entry 63 may greatly improve the overall performance of microprocessor 10, as the severe penalty due to the cache miss (which may be as many as twenty-five or more cycles) is incurred at a non-critical time, well prior to such time as the current program will require the data or instructions to which the address in address field PF0 ADDR points.

If decision 139 is YES, however, the data or instructions to be prefetched are in level 2 cache 11 or lower (i.e.,. one of level 1 caches 16), and prefetch control logic 23 then decrements the state of counter PFO CTR in process 140. The desired information may be moved to a lower level cache (e.g., one of level 1 caches 16) at this time, if desired. In decision 141, prefetch control logic 23 interrogates the state of PFO CTR and, if the contents thereof are zero, performs process 143 to invalidate the corresponding prefetch entry PF0 (by setting access bits ACC in control portion PF0C to 00). This process indicates that the prefetch indicated by prefetch field PF0 in entry 63 will likely not be effective in significantly improving performance, as the data or instructions sought by the prefetch are already in low level cache memory. If the state of counter PF0 CTR is not zero, prefetch field PF0 remains valid, but since the information is already in low level cache, no further memory access is required or useful.

According to the preferred embodiments of the present invention, therefore, significant improvement in the performance of a microprocessor and corresponding system are obtained. In particular, the cache system performance (both on-chip and off-chip) is greatly improved by the benefits of the invention in identifying potential prefetch addresses that may be moved into low level cache memory well prior to the time at which the information is actually required. This is obtained in an intelligent manner according to the preferred embodiment of the invention, by using the results of earlier passes of the instructions through the pipeline, and in combination with the branch prediction mechanism. It is therefore contemplated that these significant improvements may be obtained with only minimal impact upon normal system functionality and at relatively little cost.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of operating a microprocessor to execute a program of instructions, comprising:

applying a branch instruction address to a branch target buffer, the branch target buffer having a plurality of entries, each having a tag field for storing a branching instruction identifier, having a target field for storing a branch target fetch address, and having a first prefetch field for storing a first prefetch address;

monitoring the execution of a sequence of instructions following a first branching instruction to detect a first instruction associated with a cache miss;

associating the first detected instruction with the first branching instruction; and updating the first prefetch field of an entry in the branch target buffer corresponding to the first branching instruction, with address and control information corresponding to the first detected instruction; and responsive to a portion of the applied branch instruction address matching the tag field of one of the plurality of entries, applying the branch target fetch address of the matching entry to a first level cache memory, and applying the first prefetch address to a second, higher, level memory.

2. The method of claim 1, further comprising:

prior to the monitoring step, identifying the execution of the first branching instruction;

after the identifying step, placing information corresponding to the first branching instruction into a first branch queue; and after the associating step, removing the information corresponding to the first branching instruction from the first branch queue.

3. The method of claim 2, further comprising:

after the placing step and before the monitoring step, monitoring the execution of the sequence of instructions to detect an instruction corresponding to the target fetch address of the first branching instruction.

4. The method of claim 2, wherein the monitoring step comprises:

monitoring the execution of a sequence of instructions following the first branching instruction to detect an instruction corresponding to the target fetch address of a second branching instruction later in program sequence than the first branching instruction;

responsive to the detected instruction corresponding to the target fetch address of the second branching instruction being associated with a cache miss, performing the associating and updating steps; and responsive to the detected instruction corresponding to the target fetch address of the second branching instruction not being associated with a cache miss, performing the step of removing the information corresponding to the first branching instruction from the first branch queue.

5. The method of claim 2, further comprising:

after the step of removing the information corresponding to the first branching instruction from the first branch queue, placing the information corresponding to the first branching instruction into a second branch queue;

monitoring the execution of the sequence of instructions to detect a second instruction associated with a cache miss;

associating the second detected instruction with the first branching instruction;

after the associating step, removing the information corresponding to the first branching instruction from the second branch queue; and updating a second prefetch field of an entry in the branch target buffer corresponding to the first branching instruction, with address and control information corresponding to the second detected instruction.

6. The method of claim 1, wherein the address and control information corresponding to the first detected instruction comprises an indicator of cache level misses occurring relative to the first detected instruction.

7. The method of claim 1, wherein each entry in the branch target buffer also has a prefetch control field, including a first prefetch control portion associated with the first prefetch field to indicate whether the first prefetch field contains a valid first prefetch address.

8. The method of claim 7, wherein the prefetch control field further includes a cache line prefetch indicator for indicating, when enabled, that an additional block of memory relative to the target fetch address is to be prefetched;

and further comprising:

applying a cache line prefetch address to the second level memory based upon the target fetch address, responsive to the cache line prefetch indicator being enabled.

9. A microprocessor, comprising:

an instruction execution pipeline, comprising an execution unit, and an instruction decode unit for decoding instructions for execution by the execution unit, the instruction execution pipeline having a plurality of stages for processing instructions in sequence;

a first level memory for storing instruction codes according to instruction addresses;

a second level memory for storing information according to addresses;

a fetch unit, for addressing the first level memory with an instruction address to retrieve instruction codes for application to the instruction execution pipeline, comprising:

a branch target buffer comprised of a plurality of entries, each entry having a tag field corresponding to the instruction address of an associated branching instruction, and having a target field for storing a target fetch address, the branch target buffer for presenting the target fetch address for branching instructions predicted to be taken, each entry also including at least one prefetch field indicating a prefetch address of information to be prefetched in combination with the target fetch address for the associated branching instruction; and graduation circuitry, coupled to the instruction execution pipeline, for identifying instructions executed by the instruction execution pipeline after the associated branching instruction, and having a fetch address not corresponding to an instruction address in the first level cache memory for which an instruction code is stored, and for generating said prefetch field corresponding to the identified instructions.

10. The microprocessor of claim 9, wherein the fetch unit further comprises:

prefetch logic coupled to the branch target buffer, for receiving the prefetch address from the entry of the branch target buffer corresponding to the instruction address of an associated branching instruction, and for communicating the prefetch address to the second level memory; and update circuitry, coupled to the instruction execution pipeline, for updating entries of the branch target buffer responsive to the execution of their associated branching instructions.

11. The microprocessor of claim 10, further comprising:

memory control circuitry, for applying the fetch address to the second level memory responsive to the fetch address not corresponding to an instruction address in the first level cache memory for which an instruction code is stored.

12. The microprocessor of claim 9, wherein the first level cache memory is also for storing data operands according to data load addresses;

and wherein the graduation circuitry is also for identifying instructions executed by the instruction execution pipeline after the associated branching instruction, and associated with an operation requesting data from an address not corresponding to a data load address in the first level cache memory for which a data operand is stored, and for also generating a prefetch field corresponding to the identified instructions.

13. The microprocessor of claim 9, wherein each entry of the branch target buffer has a plurality of prefetch fields indicating a prefetch address of information to be prefetched in combination with the target fetch address for the associated branching instruction.

14. The microprocessor of claim 12, wherein the graduation circuitry comprises:

a first branch queue, for identifying branching instructions that have been executed by the instruction execution pipeline and for storing control information regarding the same; and tag check logic, for identifying an instruction executed by the instruction execution pipeline after a branch instruction, and having a fetch address not corresponding to an instruction address in the first level cache memory for which an instruction code is stored, or associated with an operation requesting data from an address not corresponding to a data load address in the first level cache memory for which a data operand is stored, and for associating the identified instruction with one of the identified branching instructions in the first branch queue.

15. The microprocessor of claim 14, wherein the tag check logic is also for identifying a target of a second identified branching instruction following a first identified branching instruction in the first branch queue, and for associating the identified target of the second branching instruction with the first identified branching instruction.

16. The microprocessor of claim 14, further comprising:

a second branch queue for storing control information regarding branching instructions that have been identified by the first branch queue;

and wherein the tag check logic is also for placing an identified branching instruction into the second branch queue after associating a first identified instruction therewith, and for identifying a second instruction executed by the instruction execution pipeline after a branch instruction, and having a fetch address not corresponding to an instruction address in the first level cache memory for which an instruction code is stored, or associated with an operation requesting data from an address not corresponding to a data load address in the first level cache memory for which a data operand is stored, and for associating the second instruction with one of the identified branching instructions in the second branch queue.

17. The microprocessor of claim 9, wherein each of the at least one prefetch fields of each entry in the branch target buffer comprises:

a prefetch address field for storing the prefetch address.

18. The microprocessor of claim 17, wherein each of the at least one prefetch fields of each entry in the branch target buffer comprises:

a prefetch counter for storing an indication of whether the prefetch address, when last prefetched, is stored in the first or second level memory.

19. The microprocessor of claim 9, wherein each of the wherein each of the at least one prefetch fields of each entry in the branch target buffer comprises:

an indicator for requesting the prefetch of a block of information at addresses following the target fetch address.

20. The microprocessor of claim 9, wherein the second level memory comprises a second level cache memory;

and further comprising:

a bus interface unit, coupled on one side to the instruction execution pipeline and to the memory, and coupled on the other side to an external bus; and main memory, external to the microprocessor, coupled to the external bus.

* * * * *